US005436423A

United States Patent [19]

Welty

[11] Patent Number: 5,436,423

[45] Date of Patent: Jul. 25, 1995

[54] METHOD AND APPARATUS FOR CONTINUOUSLY CUTTING PARTS FROM A COIL OF SHEET METAL

[75] Inventor: Robert E. Welty, Gadsden, Ala.

[73] Assignee: Iowa Precision Industries, Inc., Cedar Rapids, Iowa

[21] Appl. No.: 187,182

[22] Filed: Jan. 24, 1994

[51] Int. Cl.[6] ........ B23K 10/00

[52] U.S. Cl. ........ 219/121.39; 219/121.44; 219/121.59; 219/121.58; 219/121.67; 83/219

[58] Field of Search ........ 219/121.39, 121.59, 219/121.44, 121.48, 121.58, 121.67, 121.72; 83/249, 219, 225, 226

[56] References Cited

U.S. PATENT DOCUMENTS

| | | | |
|---|---|---|---|
| 4,551,810 | 11/1985 | Levine . | |
| 4,554,635 | 11/1985 | Levine . | |
| 4,670,640 | 6/1987 | Tylko et al. | 219/121.52 |
| 4,760,237 | 7/1988 | Mizukado et al. | 219/121.82 |
| 4,792,657 | 12/1988 | Conley | 219/121.39 |
| 4,873,418 | 10/1989 | Katayama | 219/121.67 |
| 5,200,592 | 4/1993 | Yabu | 219/121.67 |

*Primary Examiner*—Mark H. Paschall
*Attorney, Agent, or Firm*—James C. Nemmers

[57] ABSTRACT

A method and apparatus for automatically and continuously producing multiple blanks from a coil of sheet material with a minimum of scrap. The apparatus utilizes pinch rolls to advance and retract the sheet material from a coil, while simultaneously a cutter, such as plasma torch, moves transversely to the moving sheet material. Movement of the cutter and sheet material is controlled and coordinated so as to make the desired cuts in the sheet material and produce the blanks of the desired configuration.

11 Claims, 2 Drawing Sheets

METHOD AND APPARATUS FOR CONTINUOUSLY CUTTING PARTS FROM A COIL OF SHEET METAL

BACKGROUND OF THE INVENTION

The invention relates primarily to the sheet metal industry in which large quantities of parts are produced for use in the heating and cooling industry. At the present time, blanks are cut from sheet metal in a desired configuration so that the blanks can later be formed into components that are installed as part of a heating, cooling and ventilating system. As is well known to those skilled in the art, air in such systems is conveyed to or from a desired space. The sheet metal components used in such air duct systems are many and varied, and a common one is a boot which is a transition piece that connects a duct of circular cross section to a rectangular outlet. These boots and other components for air conveying systems are produced from flat blanks of sheet metal which are then formed into the desired configuration.

At the present time, blanks are produced by one of two methods. The blanks can be cut from the sheet material by the use of a punch press and die. However, each time it is desired to produce a blank of a different configuration, the die must be changed. This is expensive and time consuming. Also, because the blanks almost always have an irregular configuration, it is usually more efficient to lay out the blanks on the sheet metal so that they "nest", thus reducing the amount of scrap material. With the punch press and die method, the parts cannot be nested, thus resulting in high scrap rates.

A second known method for producing sheet metal blanks is by stacking a number of large pieces of sheet material from which the blanks are to be cut and then cutting them with a band saw. Obviously, this requires the large sheet metal pieces from which the blanks are to be cut to be cut from the coil prior to the sawing operation, and like the punch press and die method, the parts cannot be nested resulting in high scrap rates. Moreover, cutting the blanks with a band saw is noisy and somewhat dangerous, and the accuracy of the cuts is less than desirable, especially where the parts must be cut to relatively close tolerances.

There are also known methods and equipment for cutting blanks from sheet metal using a cutter, such as a plasma torch, that is mounted over a table holding the piece of sheet material from which the blanks are to be cut. The cutter is moved along two perpendicular axes, and movement of the cutter is controlled by a computer program so as to make the desired cuts to produce blanks of the desired configuration. Examples of apparatus employing this method are shown in Levine U.S. Pat. No. 4,551,810 and Levine U.S. Pat. No. 4,554,635. Although the apparatus and methods of the Levine patents have advantages over the use of punch presses or band saws, they were designed for the user who has to produce a relatively small number of sheet metal fittings and other components and who must change frequently the type and size of the blanks which are being cut. However, the methods and machines of the Levine patents cannot produce blanks continuously from a coil of material, and production is slowed somewhat by the necessity to walk around the machine to collect the finished parts and then remove the large pieces of scrap. Moreover, since the plasma torch travels over the entire surface of the table, the table supporting the material as it is cut must be periodically replaced since it becomes damaged each time a cut is made through the sheet material. Also, with a plasma torch cutter, fume removal is difficult.

There is therefore a need for a method and apparatus that will improve upon the prior art methods and machines by providing for the production of sheet metal blanks continuously and automatically at a relatively high rate of production.

SUMMARY OF THE INVENTION

The method and apparatus of the invention provides a table across which sheet metal is continuously passed from a coil, the sheet metal being advanced and retracted under the control of pinch rolls. As the sheet material is moved, a cutter such as a plasma cutting torch moves over the sheet material in a linear direction only perpendicular to the movement of the material. Linear movement of the cutting torch is simultaneous with movement of the sheet material and controlled so to produce the desired cuts in the sheet material. Because the cutting torch passes back and forth only along a single straight path over a cutting area, there is no damage to the support structure of the table beneath the sheet material, and fume removal is simplified. Also, the sheet metal blanks can be continuously and quickly advanced into a bin or onto a conveyor or the blanks can be stacked by the operator who also can remove the small scrap pieces.

DESCRIPTION OF THE PREFERRED EMBODIMENT OF THE INVENTION

Figure 1:
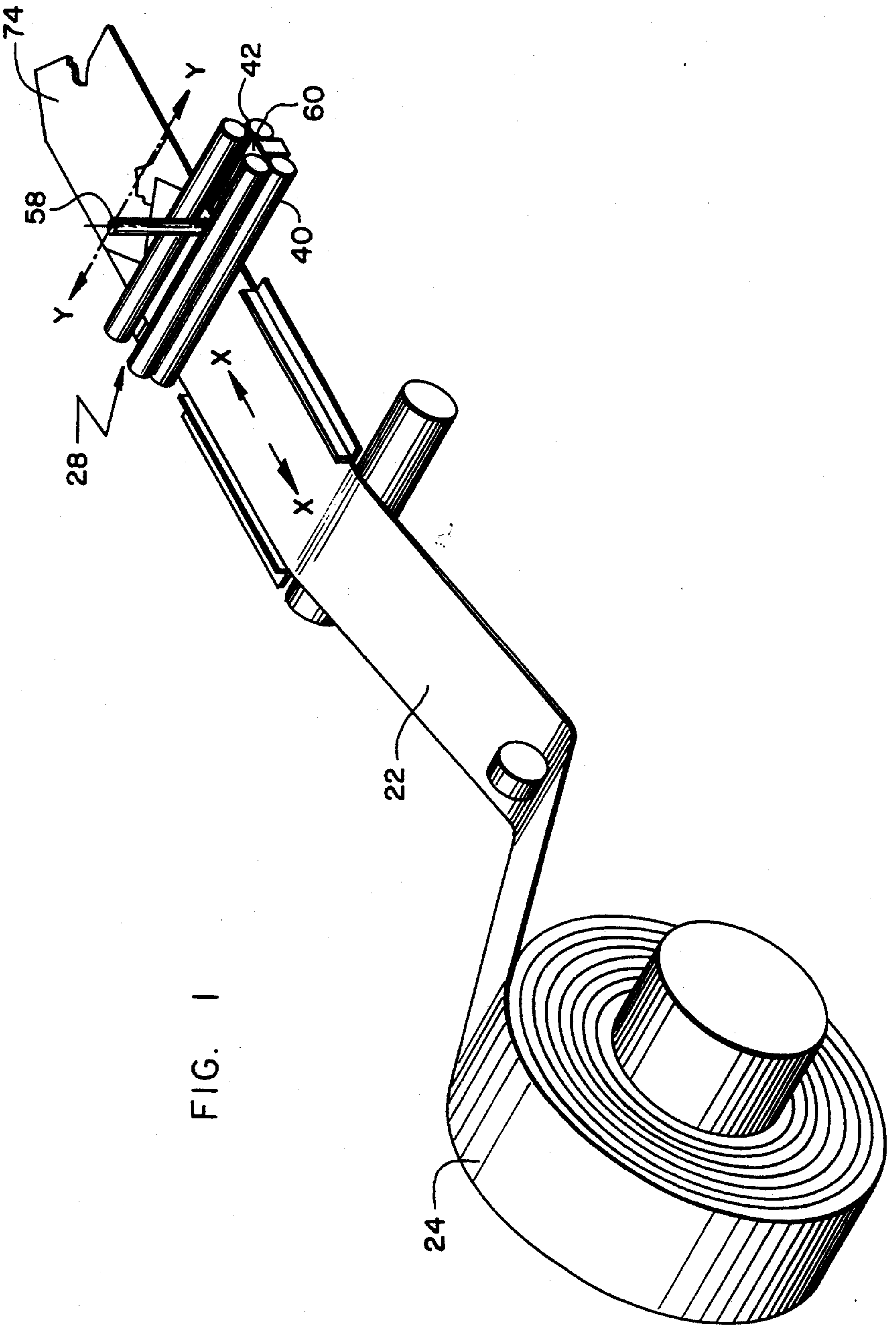
FIG. 1 is a perspective view showing schematically the operation of the method and apparatus of the invention.
Figure 4:
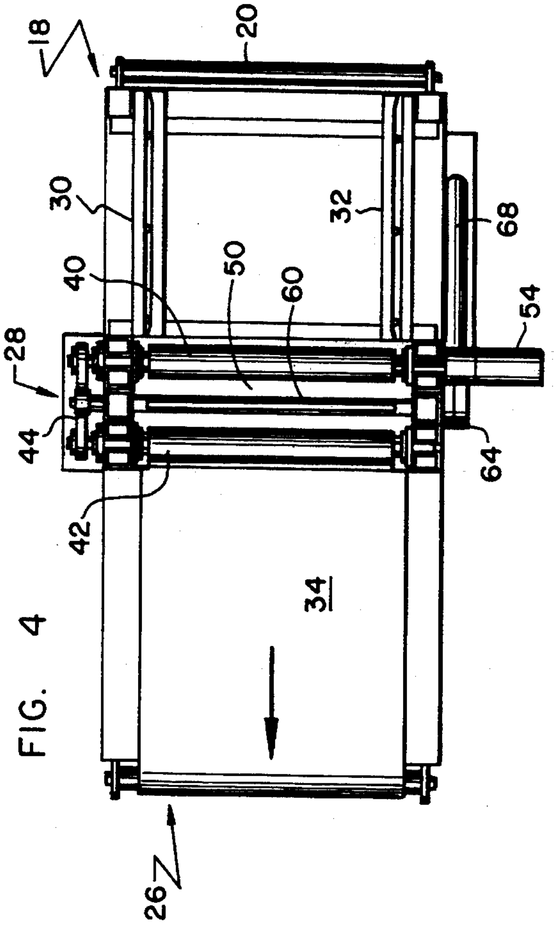
FIG. 4 is a top or plan view of the machine of FIGS. 2 and 3.
Figure 3:
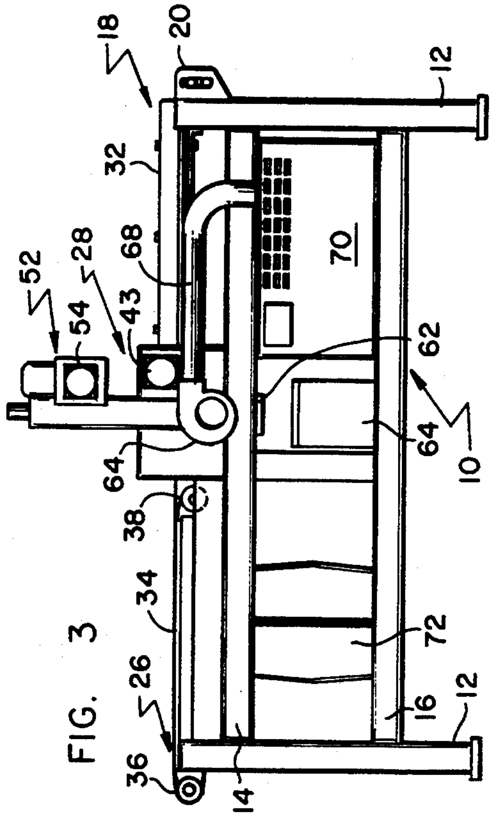
FIG. 3 is an elevational view of the side of the machine opposite to the side illustrated in FIG. 2.
Figure 5:
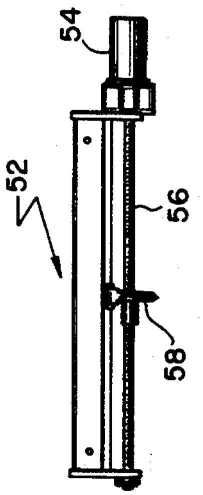
FIG. 5 is a view showing the cutting torch assembly as viewed from the discharge end of the machine.
Figure 2:
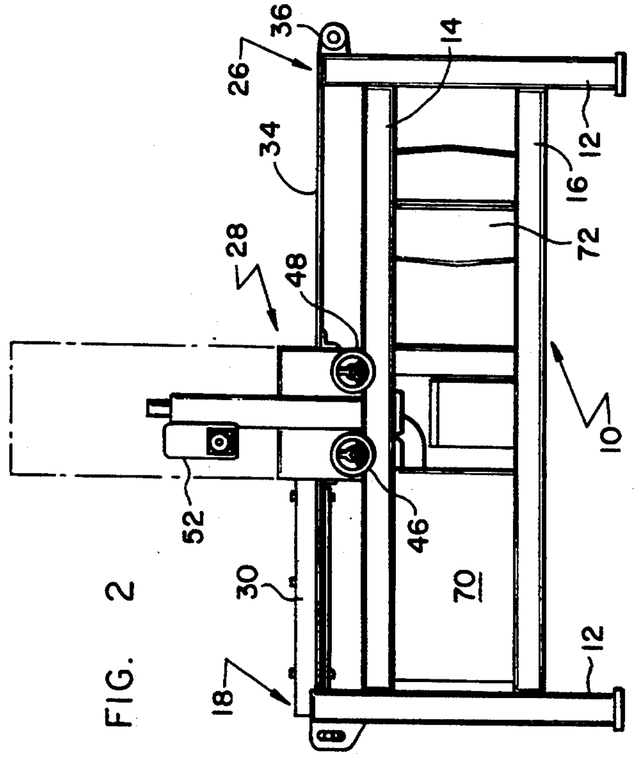
FIG. 2 is an elevational view of one side of a machine incorporating the principles of the invention.

Referring first to FIGS. 2, 3 and 4, there is illustrated an apparatus constructed according to the principles of the invention which includes a table 10 having supporting legs 12 with upper horizontal supports 14 and lower horizontal supports 16 extending along each side of the table 10 between the supporting legs 12. At the entrance end 18 of the table 10 there is mounted on a pair of the supporting legs 12 an entry roller 20 which supports the continuous feed of the sheet material 22 (see FIG. 1) from a coil 24 of the sheet material 22. Coil 24 is mounted on any suitable uncoiler (not shown) as is well known to those skilled in the art.

The end of the table 12 opposite the entrance end 18 is the discharge end 26, and between the entrance end 18 and discharge end 26 is a cutting station indicated generally by the reference numeral 28. Extending from the entry roller 20 to the cutting station 28 are a pair of parallel spaced apart guide bars 30 and 32 which both support the sheet material 22 and prevent it from moving laterally as it is fed onto the table 10 from the coil 24. One of the guide bars 32 is preferably adjustable so that the distance between the guide bars 30 and 32 can be varied depending upon the width of the sheet material 22 being fed into the machine.

From the cutting station 28 to the discharge end 26 is a conveyor that includes an endless belt 34 mounted on a pair of rollers 36 and 38. One or both of the rollers 36 and 38 is power driven in any suitable manner so that the conveyor belt 34 will move in the direction of the arrow shown in FIG. 4 to carry the cut material from the cutting station 28 and move it off the table 10.

At the cutting station 28 are two pairs of pinch rolls, the driving rolls 40 and the driven pinch rolls 42 which are mounted toward the discharge end 26 of the table 10. As best illustrated in FIG. 1, the driving pinch rolls 40 are mounted one above the other as are the driven pinch rolls 42. The driven pinch rolls 40 are powered in any suitable manner such as by a servo motor 43. The driven pinch rolls 42 are operatively connected to the driving pinch rolls 40 by a timing belt 44. The distance between the driving pinch rolls 40 can be varied by turning hand wheel 46, and similarly, the distance between the driven pinch rolls 42 can be adjusted by turning the hand wheel 48.

As best seen in FIGS. 1 and 4, the driving pinch rolls 40 and the driven pinch rolls 42 are spaced apart along the direction of movement of the sheet material 22 to define a cutting area 50 between the rolls 40 and 42. Mounted above the cutting area 50 and supported by the upper horizontal supports 14 is a cutting torch assembly indicated generally by the reference numeral 52. The assembly 52 includes a servo motor 54 which drives a screw 56 on which is mounted a cutting torch 58. Preferably, the cutting torch 58 is a plasma torch which, as is well known to those skilled in the art, heats a gas by electrical means to form a plasma for high temperature cutting. The cutting torch 58 is moved back and forth along the screw 56 under control of the servo motor 54. As best seen in FIG. 4, there is a cutting plate 60 mounted directly beneath the path of the cutting torch 58. Cutting plate 60 is mounted on the table 10 so as to be easily removable and replaced as necessary. The cutting plate 60 extends across the cutting area 50, with the remainder of the cutting area 50 being open. In FIG. 4, the torch assembly 52 has been removed so that this detail of the cutting area 50 can be illustrated.

Beneath the cutting area 50 is a dross tray 62 that collects the liquid waste from the cutting of the sheet material 22 by the cutting torch 58. The dross tray 62 can be periodically emptied into a dross bin 64 mounted on the lower horizontal supports 16 of the table 10. In order to remove the fumes which are created during the cutting of the sheet material, an exhaust blower 64 is mounted on one side of the cutting area 50 as best seen in FIG. 3. The exhaust blower 64 will suck the fumes from the cutting area 50 and pass them into an exhaust tube 68 from where the fumes can be exhausted into an air cleaner 70 or discharged from the work area into the atmosphere, whichever is desired.

The cutting torch 58 is supplied with electrical power and gas from a plasma unit 72 mounted on the lower supports 14 of the table 10. The connections between the plasma unit 72 and the cutting torch assembly 52 have not been shown for purposes of clarity. Nor have any of the electrical connections been shown for the servo motor 56 or for the servo motor 43 driving the pinch rolls 40.

The operation of the apparatus according to the method of the invention will now be summarized. The sheet material 22 is fed into the cutting station 28 being pulled from the coil 24 by the pinch rolls 40. As the sheet material 22 enters the cutting area 50, a sensor (not shown) will start operation of a control system (not shown) that will drive the servo motor 43 that drives the pinch rolls 40 and the servo motor 54 that drives the screw 56 to move the cutting torch 58. Depending upon the particular configuration of the blanks to be cut, the control system can be programmed to move the cutting torch 58 along the "Y" axis while the sheet material is advanced and retracted along the "X" axis (see FIG. 1). By simultaneously moving the sheet material 22 forward and backward while the cutting torch 58 is moving along an axis perpendicular to the direction of movement of the sheet material 22, it will be evident that any desired cut can be made in the sheet material 22. In FIG. 1, there is illustrated a configuration of a blank 74 that is generally the shape necessary to produce a sheet metal boot for use in a heating and air conveyance system. Control of movement of the sheet material 22 along the "X" axis and coordinating that movement with movement of the cutting torch 58 along the "Y" axis is within the ordinary skill of persons in the art. As the sheet material 22 is cut, the cutting plate 60 will support the sheet material 22 and also will be the only portion of the machine that can be damaged by the cutting torch 58. Obviously, replacement of the cutting plate 60 is simple and relatively inexpensive. Also, since the cutting area is confined to the area 50, it is easy to control disposal of the dross as well as exhaust the fumes from the cutting operation. By moving the sheet material 22 along the "X" axis while confining movement of the cutting torch along the "Y" axis, the drive mechanism for the apparatus is simplified and the cutting area limited which solves the problems of dross disposal, fume removal, and damage to the table.

With the method and apparatus of the invention, movement of the sheet material and cutting torch can be programmed so that the parts can be "nested". This nesting or "mirroring" of the parts saves as much as 15% of the scrap material, thus reducing the cost of producing sheet metal blanks. The method of the invention is a continuous operation eliminating the necessity of pre-cutting rectangular sheets of material from the coil and eliminating the handling of those sheets into and out of the cutting apparatus. Since the apparatus can be quickly and easily adjusted to handle sheet material of varying widths, a variety of parts can easily be accommodated by the apparatus. To change over from one blank configuration to another is a matter of reprogramming the control system that operates and controls movement of the sheet material and the cutting torch.

Since the finished cut blanks 74 are moved toward the discharge end 26 of the table 10 by the conveyor belt 34, the parts can be discharged into a storage bin (not shown) or can be manually removed by the operator who can stack the finished parts and easily remove the small scrap pieces from a single position alongside the table.

From the foregoing description, it will be evident to those skilled in the art that the method and apparatus of the invention can be used to cut a variety of materials in addition to merely sheet metal. Also, although the plasma cutting torch is at the present time the most efficient cutter for cutting sheet metal blanks, other high speed cutters are available and under development.

For example, water jet cutters might be used for certain types of materials. If so, the method and apparatus of the invention facilitate removal and disposal of the water produced by the water jet cutting process. The principles of the invention are therefore applicable to a variety of materials and cutters and can be applied to a variety of applications.

Having thus described the invention in connection with the preferred embodiment thereof, it will be evident to those skilled in the art that various revisions and modifications can be made to the embodiment described herein without departing from the spirit and scope of the invention. It is my intention, however, that all such revisions and modifications that are obvious to those skilled in the art will be included within the scope of the following claims.

What is claimed is as follows:

1. An apparatus for producing blanks of a desired configuration from a coil of stiff sheet material such as sheet metal or the like, which material is continuously fed to the apparatus, said apparatus comprising a supporting table having an entry end and a discharge end for receiving the sheet material, a material cutting station between the entry end and discharge end, material moving means for controllably advancing and retracting the material from the coil so that the material moves back and forth through the cutting station during the cutting. Operation, cutting means controllably movable back and forth in the cutting station along an axis perpendicular to the direction of movement of the material, and means for coordinating simultaneous movement of the material moving means and the cutting means so as to produce blanks of the desired configuration.

2. The apparatus of claim 1 in which the material moving means includes upper and lower pinch rolls that grip the sheet material, and means is provided for controllably rotating said rolls in one direction or the other so as to advance or retract the material under control of the control means.

3. The apparatus of claim 2 in which there are two pairs of pinch rolls, a first pair upstream from the cutting station and a second pair downstream from the cutting station.

4. The apparatus of claim 1 in which the cutting means includes a plasma cutting torch.

5. The apparatus of claim 2 in which the cutting means includes a plasma cutting torch.

6. The apparatus of claim 3 in which the cutting means includes a plasma cutting torch.

7. The apparatus of claim 1 in which means is provided to exhaust the air from the cutting station.

8. The apparatus of claim 4 in which means is provided beneath the cutting station to collect liquid waste from the cutting of the sheet material.

9. A method for cutting blanks of a desired configuration from a coil of stiff sheet material such as sheet metal or the like which is positioned within a cutting station, said method comprising: feeding the sheet material from the coil to the cutting station; controllably advancing and retracting the material fed from the coil so that the material is advanced and retracted back and forth through the cutting station; controllably moving a cutting means back and forth in the cutting station along an axis perpendicular to the direction of movement of the material simultaneously with movement of the material so as to cut blanks of the desired configuration.

10. The method of claim 9 in which the cutting means is a plasma cutting torch.

11. The method of claim 10 including also the step of exhausting the air from the cutting station to remove fumes from the cutting torch.

* * * * *